(12) United States Patent
Chang et al.

(10) Patent No.: US 10,793,785 B2
(45) Date of Patent: Oct. 6, 2020

US010793785B2

(54) HYDROCRACKING CATALYST BASED ON HIERARCHICALLY POROUS BETA ZEOLITE AND METHOD OF PREPARING THE SAME AND METHOD OF PREPARING BIO-JET FUEL FROM TRIGLYCERIDE-CONTAINING BIOMASS USING THE SAME

(71) Applicant: ADVANCED BIOMASS R&D CENTER, Daejeon (KR)

(72) Inventors: Yong Keun Chang, Sejong (KR); Minkee Choi, Daejeon (KR); Myoung Yeob Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/988,363

(22) Filed: May 24, 2018

(65) Prior Publication Data
US 2019/0136142 A1 May 9, 2019

(30) Foreign Application Priority Data
May 24, 2017 (KR) .................. 10-2017-0063879

(51) Int. Cl.
*B01J 29/04* (2006.01)
*C10G 47/18* (2006.01)
*C10G 3/00* (2006.01)
*C10L 1/04* (2006.01)
*B01J 29/74* (2006.01)
*B01J 35/00* (2006.01)
*B01J 37/02* (2006.01)
*B01J 37/08* (2006.01)
*C10G 47/20* (2006.01)

(52) U.S. Cl.
CPC ............ *C10G 47/18* (2013.01); *B01J 29/041* (2013.01); *B01J 29/042* (2013.01); *B01J 29/043* (2013.01); *B01J 29/044* (2013.01); *B01J 29/045* (2013.01); *B01J 29/7415* (2013.01); *B01J 35/0013* (2013.01); *B01J 37/0201* (2013.01); *B01J 37/0236* (2013.01); *B01J 37/088* (2013.01); *C10G 3/42* (2013.01); *C10G 3/49* (2013.01); *C10G 47/20* (2013.01); *C10L 1/04* (2013.01); *C10G 2300/1011* (2013.01); *C10G 2300/1014* (2013.01); *C10G 2300/202* (2013.01); *C10G 2300/70* (2013.01); *C10G 2400/08* (2013.01); *C10L 2200/0461* (2013.01); *C10L 2200/0469* (2013.01); *C10L 2200/0484* (2013.01); *C10L 2200/0492* (2013.01); *C10L 2270/04* (2013.01)

(58) Field of Classification Search
CPC ...... B01J 29/041; B01J 29/042; B01J 29/043; B01J 29/044; B01J 29/015; B01J 29/7215; B01J 29/7415; B01J 29/7815; B01J 2229/186; B01J 35/0013; B01J 35/1023; B01J 35/1038; B01J 35/1042; B01J 35/1047; B01J 35/1057; B01J 35/1061; B01J 35/109; B01J 37/088; B01J 37/0201; B01J 37/0236; C10L 1/04; C10L 2200/0484; C10L 2200/0469; C10L 2200/0461; C10L 2200/0492; C10L 2270/04; C10G 2300/202; C10G 2300/70; C10G 2300/1014; C10G 2300/1018; C10G 2300/1011; C10G 3/49; C10G 3/47; C10G 3/42; C10G 47/16; C10G 47/18; C10G 47/20
USPC ........ 502/60, 73, 74; 585/14, 240, 310, 322; 44/385, 605
See application file for complete search history.

(56) References Cited

U.S. PATENT DOCUMENTS 6,669,924 B1 * 12/2003 Kaliaguine ............ B01J 29/005
423/326
7,968,068 B2 * 6/2011 Bull .................... B01D 53/9418
423/239.2

(Continued)

FOREIGN PATENT DOCUMENTS

CN 102950020 A 3/2013
KR 1020140091708 A 7/2014

OTHER PUBLICATIONS

Chen et al., "BETA zeolite made from mesoporous material and its hydrocracking performance", Catalysis Today, 116, 2006, pp. 2-5.*

(Continued)

*Primary Examiner* — Elizabeth D Wood
(74) *Attorney, Agent, or Firm* — Hultquist, PLLC; Steven J. Hultquist (57) ABSTRACT

The present invention relates to a hydrocracking catalyst based on hierarchically porous beta-zeolite, a method of preparing the same, and a method of producing bio-jet fuel from triglyceride-containing biomass by use of the hydrocracking catalyst, and includes methods comprising preparing a hydrocracking catalyst by supporting a metallic active component on a hierarchically porous beta-zeolite support, and converting n-paraffins, produced from triglyceride-containing biomass, into bio-jet fuel by hydrocracking in the presence of the prepared hydrocracking catalyst. When the hydrocracking catalyst based on hierarchically porous beta-zeolite is used, the residence time of the reactant and the product in the zeolite crystals may be reduced due to additional mesopores formed in the zeolite, and thus bio-jet fuel may be produced in high yield from n-paraffin feedstock produced from triglyceride-containing biomass.

16 Claims, 6 Drawing Sheets

(56) References Cited

U.S. PATENT DOCUMENTS

| | | | | |
|---|---|---|---|---|
| 9,376,324 | B2* | 6/2016 | Senderov | B01J 29/18 |
| 10,118,163 | B1* | 11/2018 | Zhang | B01J 29/7007 |
| 2013/0090233 | A1* | 4/2013 | Simon | B01J 29/084 |
| | | | | 502/74 |
| 2013/0184147 | A1* | 7/2013 | Ryoo | C01B 39/48 |
| | | | | 502/60 |
| 2014/0213432 | A1* | 7/2014 | Martinez | B01J 29/04 |
| | | | | 502/68 |
| 2015/0086786 | A1* | 3/2015 | Itabashi | C01B 39/46 |
| | | | | 428/402 |
| 2016/0184808 | A1* | 6/2016 | Xiao | C07C 45/72 |
| | | | | 568/313 |
| 2017/0114157 | A1* | 4/2017 | Han | B01J 29/00 |
| 2018/0333708 | A1* | 11/2018 | Ding | B01J 29/7007 |

OTHER PUBLICATIONS

Verma et al., "Aviiation fuel production from lipids by a single-step route using hierarchical mesoporous zeolites", Energy Environ. Sci., 2011, 4, pp. 1667-1671.*

Choi et al., "The synthesis of a hierarchically porous BEA zeolite via pseudomorphic crystallization", Chem. Commun., 2009, pp. 2845-2847.*

Cheng, J., et al., "Optimizing Catalysis Conditions to Decrease Aromatic Hydrocarbons and Increase Alkanes for Improving Jet Biofuel Quality", "Bioresource Technology", 2014, pp. 378-382, vol. 158.

Li, T., et al., "Conversion of Waste Cooking Oil to Jet Biofuel With Nickel-Based Mesoporous Zeolite Y Catalyst", "Bioresource Technology", 2015, pp. 289-294, vol. 197.

\* cited by examiner

HYDROCRACKING CATALYST BASED ON HIERARCHICALLY POROUS BETA ZEOLITE AND METHOD OF PREPARING THE SAME AND METHOD OF PREPARING BIO-JET FUEL FROM TRIGLYCERIDE-CONTAINING BIOMASS USING THE SAME

TECHNICAL FIELD

The present invention relates to a hydrocracking catalyst based on hierarchically porous beta-zeolite, a method of preparing the same, and a method of producing bio-jet fuel from triglyceride-containing biomass by use of the hydrocracking catalyst, and more particularly to a hydrocracking catalyst based on hierarchically porous beta-zeolite, which comprises a hierarchically porous beta-zeolite support and a metallic active component supported in the support, a method of preparing the same by supporting a metallic active component on a hierarchically porous beta-zeolite support, followed by heat treatment, and a method of producing bio-jet fuel with high selectivity from triglyceride-containing biomass by use of the hydrocracking catalyst.

BACKGROUND ART

Studies on the development of sustainable alternative fuels have been actively conducted worldwide to solve problems associated with the reduction of petroleum, from which high-quality liquid fuels can be produced, and global warming caused by carbon dioxide emissions. When biomass is used as an alternative fuel in this respect, there are advantages in that carbon dioxide emissions can be reduced and high-quality fuels containing no sulfur or nitrogen compounds can be produced. For this reason, studies on the conversion of various biomass materials such as lignocellulosic materials, triglyceride-containing vegetable oils or animal fats and microalgae into liquid fuels have received attention. Liquid fuels, produced from lignocellulosic materials composed of pentose and hexose, among the above-mentioned biomass materials, are mostly hydrocarbons in the gasoline range. For this reason, the use of lignocellulosic materials has a disadvantage in that an additional polymerization process needs to be performed to produce fuels having long carbon chain lengths, such as jet fuel and diesel. On the other hand, triglyceride-based biomass generally has a carbon chain length of 12 to 22 and is in the diesel range, and thus is easy to use as fuels, and jet fuels can also be produced therefrom by hydrocracking.

By virtue of the above-described advantages, studies on the use of triglyceride as an alternative fuel have been actively conducted worldwide. A method of producing biodiesel by transesterification with methanol ($CH_3OH$) or ethanol ($C_2H_5OH$) in the presence of a basic catalyst such as sodium hydroxide (NaOH) or potassium hydroxide is mostly widely known. However, biodiesel produced still contains a large amount of oxygen in the molecule and has poor thermal stability, and for this reason, it is unsuitable for direct use as fuel. Thus, Biodiesel ultimately needs to be converted to a hydrocarbon from which oxygen in the molecule has been completely removed by deoxygenation.

To this end, a hydrotreating process which is currently used in crude oil refining processes is applied. In general, studies on the production of oxygen-free hydrocarbons by use of sulfided nickel (Ni)-molybdenum (Mo) or cobalt (Co)-molybdenum-supported catalysts in the presence of both hydrogen sulfide ($H_2S$) and hydrogen have been actively conducted (Chen Zhao et al., *Green Chem.*, 15 (2013) 1720-1739). Hydrocarbons produced through this process are normal paraffin-type hydrocarbons and are produced by hydrodeoxygenation, decarbonylation or decarboxylation. However, the flow properties (such as freezing point, cloud point and the like) of these hydrocarbons are too poor for direct use as fuels, and thus need to be improved by hydroisomerization or hydrocracking.

Jet fuels generally have a carbon chain length of 8 to 16, are composed of about 75 wt % of n-, iso- and cyclo-paraffins and about 25 wt % of aromatic compounds, and should exist as liquid even at −47° C. or below. Generally, with regard to converting either triglyceride-containing biomass or n-paraffins, produced from triglyceride-containing biomass, to hydrocarbons in the jet fuel range by hydrocracking, the following technologies were published.

Literatures indicating that hydrocarbons in the jet fuel range were produced by a one-step process from triglyceride-containing biomass as a reactant in the presence of hydrocracking catalysts are as follows. Tao Li et al. reported that the use of waste cooking oil as a reactant in the presence of Y zeolite loaded with 10 wt % of nickel made it possible to obtain 53 wt % of paraffins in the jet fuel range and 13.4 wt % of aromatic compounds (Tao Li et al., *Bioresource Technol.*, 197 (2015) 289-294). Jun Cheng et al. conducted studies on the production of hydrocarbons in the jet fuel range by use of soybean oil as a reactant in the presence of Y and ZSM-5 zeolites loaded with 8 wt % of nickel and 12 wt % of molybdenum (Jun Cheng et al., *Bioresource Technol.*, 158 (2014) 378-382). As a result, they reported that the use of Y zeolite made it possible to obtain 40.3 wt % of paraffins in the jet fuel range and 23.8 wt % of aromatic compounds, and the use of ZSM-5 zeolite made it possible to obtain 13.8 wt % of paraffins and 58.9 wt % of aromatic compounds. However, the above results do not satisfy the American Society for Testing and Materials (ASTM) D7566-14 standard (indicating that the content of aromatic compounds should be less than 0.5 wt %), suggesting that the products are unsuitable to blend in conventional jet fuels.

On the other hand, a two-step process of producing jet fuel by producing n-paraffins by hydrotreating of triglycerides, followed through hydrocracking of the n-paraffins, was also proposed. In U.S. Pat. No. 8,742,183B2, soybean oil as a reactant was converted to n-paraffins by use of a deoxygenation catalyst. It reported that when conversion of the produced n-paraffins as a reactant was then performed in the presence of a hydrocracking catalyst, about 40 wt % of jet fuel was obtained while no aromatic compound was produced. In U.S. Patent Publication No. 2008/0244962A1, non-edible beef tallow as a reactant was converted to n-paraffins by use of a sulfided nickel-molybdenum-based catalyst. It reported that jet fuel containing no aromatic compound was then obtained from the produced n-paraffins by use of a silica-alumina catalyst loaded with platinum and palladium. Thus, in order to satisfy the current bio-jet fuel standard, a two-step process is preferable which comprises converting triglyceride-containing biomass to n-paraffins and converting the produced n-paraffins to paraffins in the jet fuel range by use of hydrocracking catalysts.

Hydrocracking catalysts, which are used to produce jet fuels from n-paraffins produced from triglyceride-containing biomass as described above, generally have both a metal moiety and an acid moiety. As the metal moiety, 0.1 to 5.0 wt % of a precious metal such as platinum (Pt) or palladium (Pd), or 5.0 to 30 wt % of a transition metal such as nickel or molybdenum, supported in a support, has been used, and as the acid moiety, zeolite has generally be used.

However, micropores (pore diameter: <2 nm) present in conventional zeolite has the disadvantage of restricting the molecular diffusion of a reactant (n-paraffin-containing hydrocarbon feedstock) and a product (iso-paraffin-containing hydrocarbon feedstock) in catalytic reactions. In particular, when the diffusion of the product in hydrocracking is limited, there is a disadvantage in that secondary hydrocracking occurs in the micropores so that hydrocarbons having an excessively short chain length will be produced, thus reducing the yield of hydrocarbons in the jet fuel range.

Accordingly, the present inventors have made extensive efforts to solve the above-described problems, and as a result, have found that when a hydrocracking catalyst capable of maximizing the yield of bio-jet fuel is prepared by supporting a metallic active component on hierarchically porous beta-zeolite and when the hydrocracking catalyst comprising the metallic active component supported in hierarchically porous beta-zeolite is applied to hydrocracking of n-paraffins produced from triglyceride-containing biomass, bio-jet fuel containing no aromatic compound can be obtained in high yield, thereby completing the present invention.

SUMMARY OF THE INVENTION

It is an object of the present invention to provide a hydrocracking catalyst comprising a metallic active component supported in hierarchically porous beta-zeolite, and a method of preparing the hydrocracking catalyst.

Another object of the present invention is to provide a method of producing bio-jet fuel from triglyceride-containing biomass, in which a hydrocracking catalyst comprising a metallic active component supported on hierarchically porous beta-zeolite is applied to hydrocracking of n-paraffins produced from triglyceride-containing biomass so that bio-jet fuel containing no aromatic compound can be obtained in high yield.

The above objects of the present invention can be achieved by the present invention as specified below.

To achieve the above object, the present invention provides a hydrocracking catalyst based on hierarchically porous beta-zeolite, which comprises: (A) a hierarchically porous beta-zeolite support; and (B) a metallic active component supported on the support.

The present invention also provides a method of preparing a hydrocracking catalyst based on hierarchically porous beta-zeolite comprising: (a) supporting a metallic active component on the hierarchically porous beta-zeolite; and (b) heat treatment of the hierarchically porous beta-zeolite in which the metallic active component supported.

The present invention also provides a method of producing bio-jet fuel from triglyceride-containing biomass, the method comprising the steps of: (a) deoxygenating the triglyceride-containing biomass in the presence of a deoxygenation catalyst, thereby producing n-paraffins; and (b) hydrocracking the produced n-paraffins in the presence of the hydrocracking catalyst based on hierarchically porous beta-zeolite, thereby producing bio-jet fuel.

BEST MODE FOR CARRYING OUT THE INVENTION

Unless defined otherwise, all the technical and scientific terms used herein have the same meaning as those generally understood by one of ordinary skill in the art to which the invention pertains. Generally, the nomenclature used herein and the experiment methods, which will be described below, are those well-known and commonly employed in the art.

In addition, the present inventors have found that when a hydrocracking catalyst comprising a metallic active component supported in hierarchically porous beta-zeolite is applied to hydrocracking of n-paraffins produced from triglyceride-containing biomass, bio-jet fuel can be obtained in high yield without any aromatic compound.

Therefore, in one aspect, the present invention is directed to a hydrocracking catalyst based on hierarchically porous beta-zeolite, which comprises: (A) a hierarchically porous beta-zeolite support; and (B) a metallic active component supported on the hierarchically porous beta-zeolite support.

In another aspect, the present invention is directed to a method of preparing a hydrocracking catalyst based on hierarchically porous beta-zeolite comprising: (a) supporting a metallic active component on the hierarchically porous beta-zeolite; and (b) heat-treating the hierarchically porous beta-zeolite in which the metallic active component supported.

Hereinafter, the present invention will be described in detail.

In the present invention, the hierarchically porous beta-zeolite is a beta-zeolite having a three-dimensional channel structure, and has additional mesopores in the beta-zeolite structure (BEA structure). This means that the hierarchically porous beta-zeolite has a larger external surface area and additional mesopores (pore diameter: 2 to 50 nm), compared to conventional zeolites having only micropores. In other words, the hierarchically porous beta-zeolite has both micropores having a size of less than 2 nm and mesopores having a size of 2 to 50 nm simultaneously. Due to these characteristics, the molecular diffusion of the product in the zeolite is promoted, thus increasing the yield of bio-jet fuel.

The hydrocracking catalyst according to the present invention can be prepared by supporting a metallic active component on a hierarchically porous beta-zeolite; and heat-treating the hierarchically porous beta-zeolite having the metallic active component supported thereon.

The hierarchically porous beta-zeolite may have a crystallite size of 50 nm or less, preferably 10 to 50 nm. In addition, preferably, the hierarchically porous beta-zeolite has a specific surface area of 600 to 850 m$^2$g$^{-1}$, an external surface area of 100 to 400 m$^2$g$^{-1}$, a mesopore volume of 0.3 to 1.5 cm$^3$g$^{-1}$, and a total pore volume of 0.5 to 2.0 cm$^3$g$^{-1}$. If the crystallite size of the zeolite prepared exceeds 50 nm and the specific surface area, the external surface area, the mesopore volume, and the total pore volume thereof are less than the lower limits of the above-specified ranges, the residence time of the reactant and the product in the zeolite crystals will be increased. For this reason, there is a problem in that hydrocarbons having an excessively short chain length will be produced due to secondary hydrocracking of iso-paraffin produced, thus reducing the yield of hydrocarbons in the jet fuel range.

The metallic active component that can be used in the hydrocracking catalyst according to the present invention may be one or more selected from the group consisting of platinum (Pt), palladium (Pd), ruthenium (Ru), iron (Fe), nickel (Ni), cobalt(Co), and molybdenum (Mo), preferably platinum or palladium. Pt(NH$_3$)$_4$(NO$_3$)$_2$, H$_2$PtCl$_6$.5.5H$_2$O, or Pt(NH$_3$)$_4$Cl$_2$.xH$_2$O can be used as a platinum precursor. In this case, the content of the metallic active component may be 0.1 to 30 wt %, preferably 0.5 to 10 wt % based on the total weight of the hydrocracking catalyst prepared. The metallic active component may be supported on the hierarchically porous beta-zeolite by wet impregnation or incipient wetness impregnation.

Then, the hierarchically porous beta-zeolite powder sample having the metallic active component supported thereon may be calcined in a dry air atmosphere at 200 to 600° C. for 1 to 24 hours, and additionally be reduced in a hydrogen atmosphere at 200 to 600° C. for 1 to 24 hours, thereby preparing a platinum-supported hydrocracking catalyst. If the calcination and reduction temperatures are greatly out of the above-specified ranges, the hydrogenation and dehydrogenation abilities of the metallic active component may be lowered, and thus the yield of hydrocarbons in the jet fuel range can be lowered when the metallic active component is used as a hydrocracking catalyst.

In addition, the deoxygenation catalyst may be prepared by supporting and drying an aqueous solution containing a platinum precursor on an alumina support by incipient wetness impregnation, and then calcining the dried aqueous solution in a dry air atmosphere and reducing the calcined powder in a hydrogen atmosphere.

In still another aspect, the present invention is directed to a method of producing bio-jet fuel from triglyceride-containing biomass, the method comprising the steps of: (a) deoxygenating the triglyceride-containing biomass in the presence of a deoxygenation catalyst, thereby producing n-paraffins; and (b) hydrocracking the produced n-paraffins in the presence of a hydrocracking catalyst comprising a hierarchically porous beta-zeolite support and a metallic active component supported on the support, thereby producing bio-jet fuel.

Further, the method of the present invention comprises a process of producing n-paraffins from the triglyceride-containing biomass through deoxygenating prior to hydrocracking in order to produce bio-jet fuel from triglyceride-containing biomass using the hydrocracking catalyst based on hierarchically porous beta-zeolite. The deoxygenating may be performed at a reaction temperature of 200 to 450° C., a hydrogen pressure of 1 to 150 atm, a weight hourly space velocity (WHSV) of 0.1 to 20 h$^{-1}$, and a hydrogen gas flow/triglyceride liquid flow volume ratio of 500 to 10,000.

Then, when the hydrocracking catalyst based on hierarchically porous beta-zeolite as prepared above is used, bio-jet fuel can be produced from n-paraffins produced from the triglyceride-containing biomass. At this time, the hydrocracking may be performed at a reaction temperature of 200 to 400° C., a hydrogen pressure of 1 to 150 atm, a weight hourly space velocity (WHSV) of 0.1 to 20 h$^{-1}$, and a hydrogen gas flow/triglyceride liquid flow volume ratio of 500 to 10,000.

In the present invention, the triglyceride-containing biomass may be one or more selected from the group consisting of monoglyceride, diglyceride, fatty acid, fatty alcohol, and fatty acid alkyl ester. The triglyceride-containing biomass may be vegetable oil, animal fat, or microalgae. Preferably, the vegetable oil may be one or more selected from the group consisting of palm oil, olive oil, rapeseed oil, and soybean oil, the animal fat may be non-edible beef tallow, and the microalgae may be one or more selected from the group consisting of *Aurantiochytrium*, *Chlorella*, and *Nannochloropsis*. In an example of the present invention, jet fuel may be produced from n-paraffin feedstock, produced from vegetable oil such as palm oil or microalgae such as *Aurantiochytrium*, in the presence of the hydrocracking catalyst prepared as described above.

Embodiment

Hereinafter, the present invention will be described in further detail with reference to examples. It will be obvious to a person having ordinary skill in the art that these examples are for illustrative purposes only and are not to be construed to limit the scope of the present invention.

Preparation Example 1

Preparation of Hierarchically Porous Beta-Zeolite Support

Hierarchically porous beta-zeolite was prepared by a hydrothermal synthesis method using the following raw materials according to the method described in M. Choi et al., *Chem. Commun.*, 2009, 2845-2847.

Colloidal silica (Ludox AS-30, 30 wt % suspension in H$_2$O, Aldrich), aluminum sulfate (Al$_2$(SO$_4$)$_3$18H$_2$O, Sigma-Aldrich), sodium hydroxide (NaOH, Junsei), sulfuric acid (H$_2$SO$_4$, Junsei), cyclic diammonium (CD) and deionized water were stirred at room temperature (25° C.), thereby preparing a gel having the following composition:

The gel having the above-described composition was crystallized in a stainless autoclave at 170° C. for 24 hours, and then the autoclave was cooled to room temperature. The produced crystallized material was filtered, washed several times with distilled water, dried at 100° C., and then calcined at 550° C. for 10 hours, thereby preparing hierarchically porous beta-zeolite.

The hierarchically porous beta-zeolite prepared as described above had a silicon/aluminum (Si/Al) molar ratio of 13. To use the hierarchically porous beta-zeolite as a support for a hydrocracking catalyst, ion exchange was performed as follows.

111 mL of a 0.1 M aqueous solution of sodium nitrate was added to 1 g of the hierarchically porous beta-zeolite and stirred at room temperature for 4 hours. Then, the hierarchically porous beta-zeolite was filtered, washed with deionized water and dried in an oven at 100° C. After this process was repeated three times, the dried NH$_4^+$ type beta-zeolite was collected and calcined at 550° C. in a dry air atmosphere for 3 hours, thereby obtaining H$^+$ type beta-zeolite.

Comparative Preparation Example 1

Conventional beta-zeolite having only micropores was prepared by a hydrothermal synthesis method using the following raw materials.

Fumed silica (CABOT, CAB-O-SIL M-5), sodium aluminate (NaAl, Sigma-Aldrich, Al 50-56%, Na 40-45%), sodium hydroxide (NaOH, Junsei), potassium chloride (KCl, Sigma-Aldrich), potassium hydroxide (KOH, Sigma-Aldrich), tetraethylammonium hydroxide (TEAOH, TCI, 35% in water) and deionized water were stirred at room temperature (25° C.), thereby preparing a gel having the following composition:

2.25Na$_2$O: 2.0K$_2$O: 13(TEA)$_2$O: 1.0Al$_2$O$_3$: 50SiO$_2$: 765H$_2$O: 5.0 HCl

The gel having the above-described composition was crystallized by leaving it in a stainless autoclave at 170° C. for 48 hours, and then the autoclave was cooled to room temperature. The produced crystallized material was filtered, washed several times with deionized water, dried at 100° C., and then calcined at 550° C. for 10 hours, thereby preparing conventional beta-zeolite having only micropores.

The conventional beta-zeolite having only micropores prepared as described above had a silicon/aluminum (Si/Al) molar ratio of 12. To use the conventional beta-zeolite as a support for a hydrocracking catalyst, ion exchange was performed as follows.

111 mL of a 0.1 M aqueous solution of sodium nitrate was added to 1 g of the conventional beta-zeolite having only micropores and stirred at room temperature for 4 hours. Then, the beta-zeolite was filtered, washed with deionized water and dried in a dryer at 100° C. After this process was repeated three times, the dried NH$_4^+$ type beta-zeolite was collected and calcined at 550° C. in a dry air atmosphere for 3 hours, thereby obtaining H$^+$ type beta-zeolite.

Example 1

XRD, TEM and Nitrogen (N$_2$) Physisorption Measurement

Figure 1:
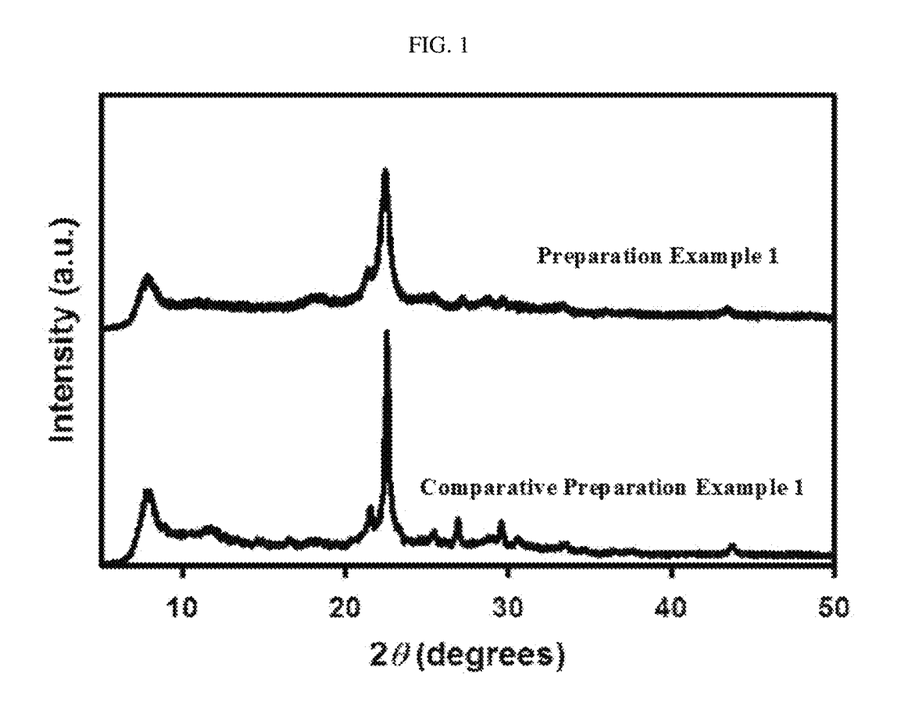
FIG. 1 is a graph showing the results of XRD analysis of beta-zeolites prepared in a Preparation Example and a Comparative Preparation Example.
Figure 2:
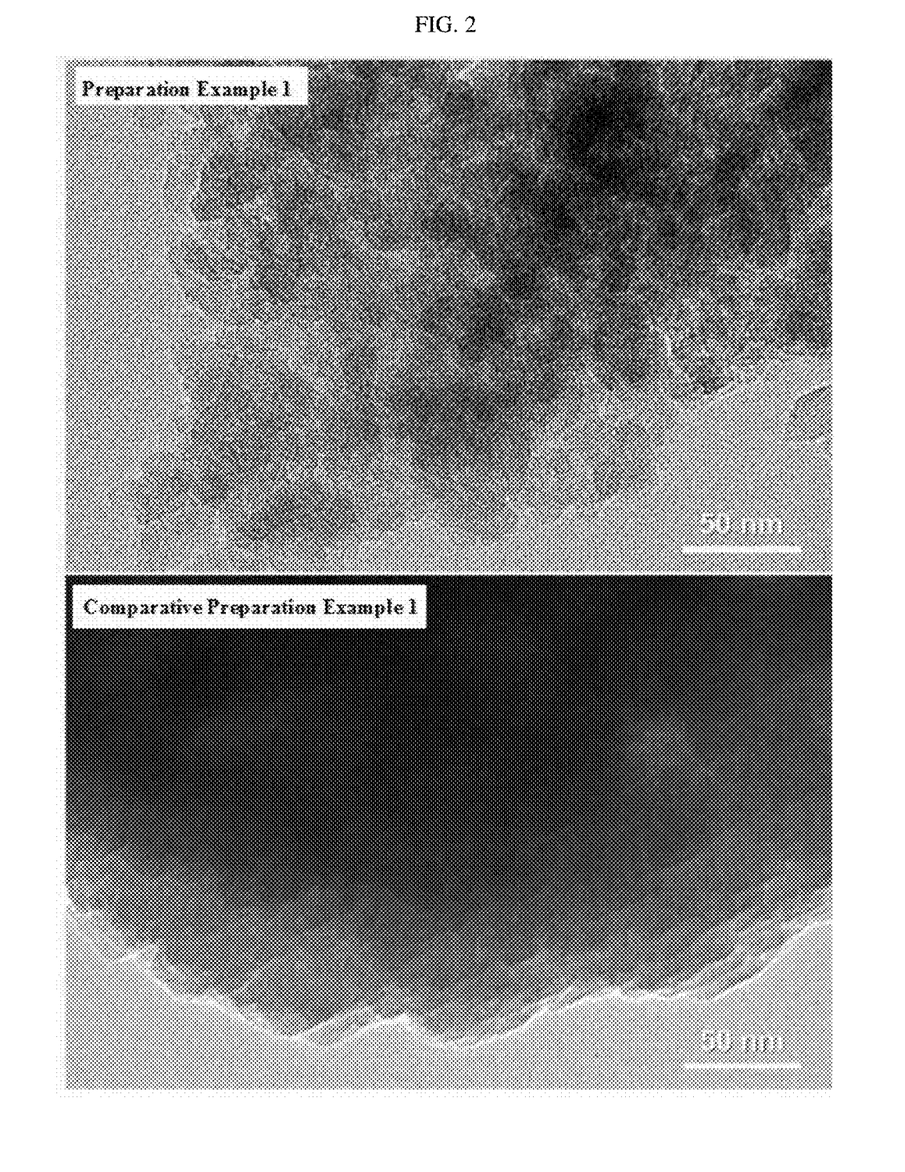
FIG. 2 shows TEM images of beta-zeolites prepared in a Preparation Example and Comparative Preparation Example of the present invention.
Figure 3:
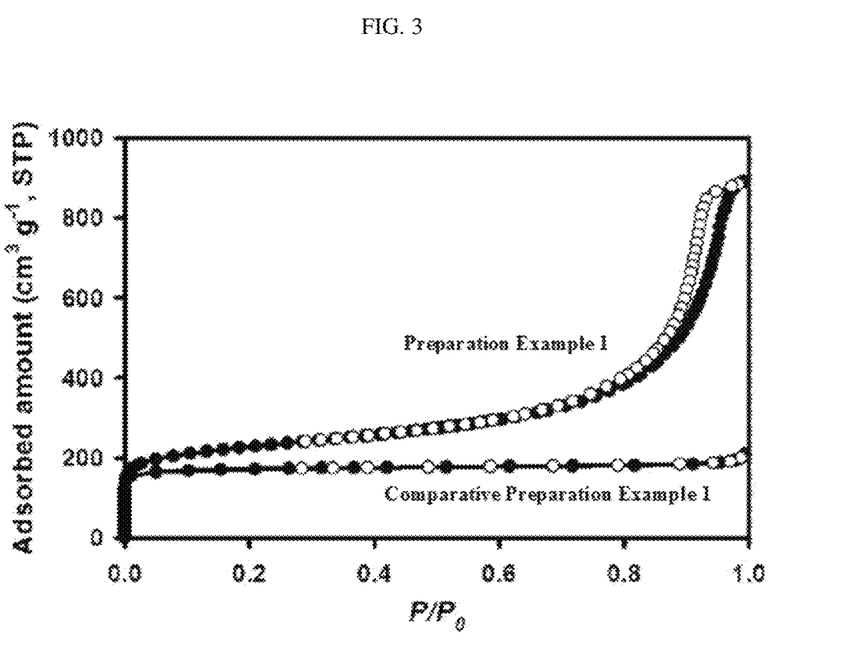
FIG. 3 is a graph showing the results of measuring the nitrogen ($N_2$) physisorption of beta-zeolites prepared in a Preparation Example and Comparative Preparation Example of the present invention.

FIG. 1 is a graph showing the results of XRD analysis of the beta-zeolites prepared in the Preparation Example and the Comparative Preparation Example, and FIG. 2 shows TEM images of the beta-zeolites prepared in the Preparation Example and the Comparative Preparation Example.

As can be seen in FIG. 1, the beta-zeolites prepared in the Preparation Example and the Comparative Preparation Example had a BEA structure, and as can be seen in FIG. 2, the zeolite prepared in Preparation Example 1 had well-developed mesopores and a smaller crystallite size, compared to the zeolite prepared in the Comparative Preparation Example. In particular, it was shown that the zeolite prepared in Preparation Example 1 had a crystallite size of about 10 to 50 nm.

To measure the specific surface areas, external surface areas, mesopore volumes and total pore volumes of the beta-zeolites prepared in the Preparation Example and the Comparative Preparation Example, nitrogen (N$_2$) physisorption was performed. 0.1 g of each of the zeolites prepared in the Preparation Example and the Comparative Preparation Example was pretreated in a vacuum at 400° C. for 4 hours, and then nitrogen was adsorbed onto the zeolites at a temperature of −196° C. The specific surface areas, external surface areas, mesopore volumes and total pore volumes of the prepared zeolites were calculated using the amount of nitrogen adsorbed and the t-plot method. The results are shown in Table 1 below.

TABLE 1

| | Specific surface areas (m$^2$g$^{-1}$) | External surface areas (m$^2$g$^{-1}$) | Mesopore volumes (cm$^3$g$^{-1}$) | Total pore volumes (cm$^3$g$^{-1}$) |
|---|---|---|---|---|
| Preparation Example 1 | 789 | 316 | 1.14 | 1.36 |
| Comparative Preparation Example 1 | 540 | 35 | 0.04 | 0.29 |

As can be seen in Table 1 above, the hierarchically porous beta-zeolite prepared in Preparation Example 1 of the present invention showed an increase in the specific surface area of about 250 m$^2$g$^{-1}$, an increase in the external surface area of about 280 m$^2$g$^{-1}$, an increase in the mesopore volume of 1.1 cm$^3$g$^{-1}$, and an increase in the total pore volume of about 0.9 cm$^3$g$^{-1}$, compared to the zeolite prepared in Comparative Preparation Example 1 which only have micropores.

Example 2

Production of n-Paraffins from Palm Oil- and *Aurantiochytrium*-Based Triglycerides Preparation of Deoxygenation Catalyst To produce n-paraffins from palm oil- and *Aurantiochytrium*-based triglycerides, deoxygenation catalyst was prepared using an aqueous solution of a platinum precursor, and platinum was loaded on a gamma alumina (γ-Al$_2$O$_3$, strem) support by incipient wetness impregnation. As the platinum precursor, Pt(NH$_3$)$_4$(NO$_3$)$_2$ was used, and the amount of platinum supported was 1.0 wt % based on the weight of the deoxygenation catalyst. The platinum-supported powder sample was dried in an oven at 100° C. for 4 hours or more, and then calcined in a dry air atmosphere at 400° C. for 3 hours. The calcined sample was then reduced in a hydrogen atmosphere at 400° C. for 3 hours, thereby obtaining a platinum-supported deoxygenation catalyst.

Production of n-Paraffins from Palm Oil- and *Aurantiochytrium*-Based Triglycerides Reactions for producing n-paraffins from palm oil- and *Aurantiochytrium*-based triglycerides in the presence of the prepared deoxygenation catalyst were performed. To this end, the palm oil-based triglyceride was converted to n-paraffins under the following conditions: reaction temperature of 360° C.; hydrogen pressure of 20 atm; weight hourly space velocity (WHSV) of 1.0 h$^{-1}$; and volume ratio of hydrogen gas flow introduced/liquid palm oil flow introduced of 2300. The *Aurantiochytrium*-based triglyceride was converted to n-paraffins under the following conditions: reaction temperature of 360° C.; hydrogen pressure of 20; weight hourly space velocity (WHSV) of 1.0 h$^{-1}$; and volume ratio of hydrogen gas flow introduced/liquid palm oil flow introduced of 7200. The compositions of the produced n-paraffins are shown in Table 2 below.

TABLE 2

| Carbon chain length | n-Paraffins produced from palm oil-based triglyceride (wt %) | n-Paraffins produced from *Aurantiochytrium*-based triglyceride(wt %) |
| --- | --- | --- |
| $C_{13}$ | 1.0 | 1.9 |
| $C_{14}$ | 0.4 | 1.1 |
| $C_{15}$ | 40.6 | 30.2 |
| $C_{16}$ | 3.9 | 5.2 |
| $C_{17}$ | 48.3 | 4.7 |
| $C_{18}$ | 4.3 | 1.0 |
| $C_{19}$ | — | 2.5 |
| $C_{20}$ | — | 1.4 |
| $C_{21}$ | — | 43.4 |
| $C_{22}$ | — | 8.6 |

Example 3

Production of Bio-Jet Fuel from n-Paraffins Produced from Palm Oil-Based Triglyceride Preparation of Hydrocracking Catalyst Using the zeolite powders prepared by the Preparation Example and the Comparative Preparation Example with an aqueous solution of a platinum precursor, platinum was loaded on the zeolite support by incipient wetness impregnation. As the platinum precursor, $Pt(NH_3)_4(NO_3)_2$ was used, and the amount of platinum supported was 1.0 wt % based on the weight of the hydrocracking catalyst. The platinum-supported powder sample was dried in an oven at 100° C. for 4 hours or more, and then calcined in a dry air atmosphere at 400° C. for 3 hours. The calcined sample was then reduced in a hydrogen atmosphere at 400° C. for 3 hours, thereby obtaining a platinum-supported hydrocracking catalyst.

Production of Bio-Jet Fuel from n-Paraffins Produced from Palm Oil-Based Triglyceride To produce bio-jet fuel from the n-paraffins produced in Example 2, a hydrocracking reaction was performed. Before the reaction, the prepared hydrocracking catalyst was formed into a pellet by application of pressure, and then the pellet was crushed to a size of 150 to 200 μm, placed in a stainless-steel fixed-bed continuous flow reactor (inner diameter: ½ inch) and reduced in-situ under a hydrogen atmosphere at 400° C. Hydrocracking of the n-paraffins produced from palm oil-based triglyceride was performed under the following conditions: reaction temperature of 200 to 300° C.; hydrogen pressure of 20 atm; weight hourly space velocity (WHSV) of 2.0 $h^{-1}$; and volume ratio of hydrogen gas flow introduced/liquid n-paraffin flow introduced of 2580. After the reaction, the liquid product was collected using a trap adjusted at 160° C., and then the physical properties thereof were analyzed. As a result, it could be seen that when the hydrocracking catalyst prepared using the hierarchically porous beta-zeolite support in the Preparation Example was used, the liquid yield was 47 wt % based on the weight of n-paraffins introduced, and when the hydrocracking catalyst prepared using the beta-zeolite support in the Comparative Preparation Example was used, the liquid yield was 30 wt % based on the weight of n-paraffins introduced.

Figure 4:
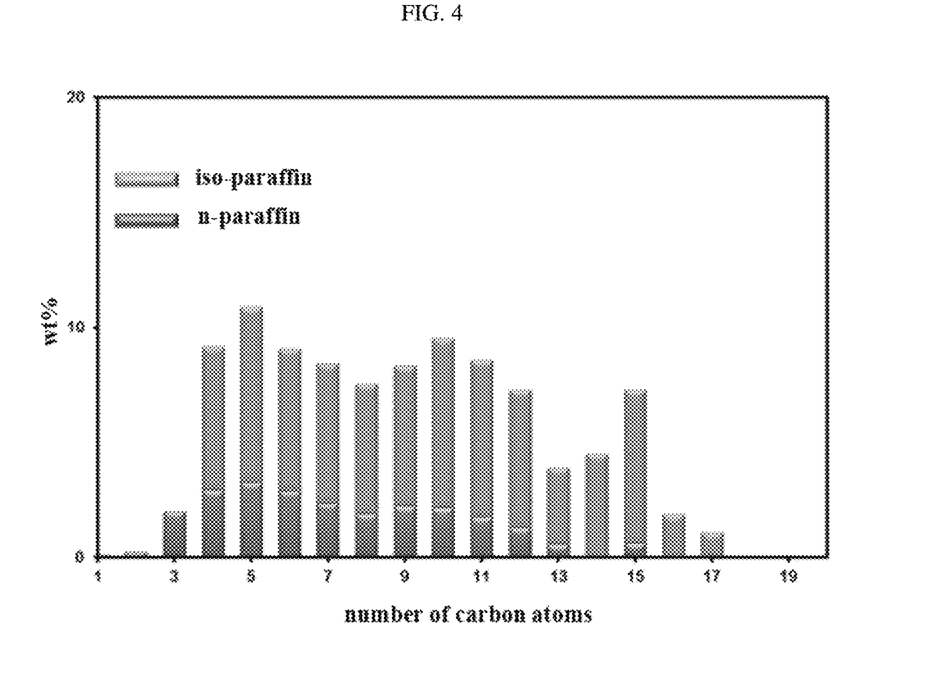
FIG. 4 is a graph showing the hydrocarbon distribution of the products obtained by hydrocracking of n-paraffins, produced from palm oil-based triglyceride, in the presence of a hydrocracking catalyst prepared using a beta-zeolite prepared in Comparative Preparation Example 1 of the present invention as a support.
Figure 5:
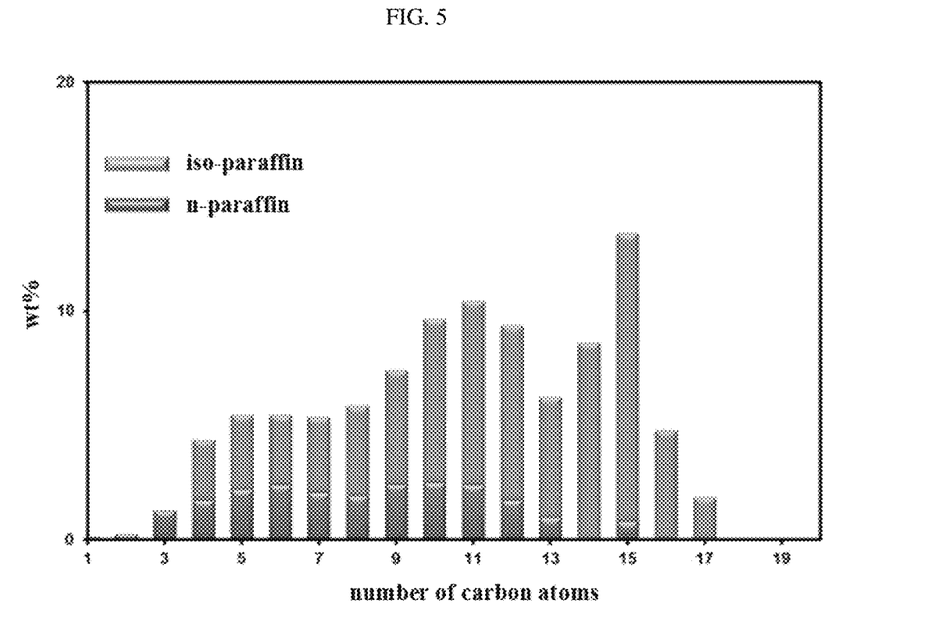
FIG. 5 is a graph showing the hydrocarbon distribution of a products obtained by hydrocracking of n-paraffins, produced from palm oil-based triglyceride, in the presence of a hydrocracking catalyst prepared using a beta-zeolite prepared in Preparation Example 1 of the present invention as a support.

The products were analyzed by offline gas chromatography. FIG. 4 shows the distribution of total hydrocarbons obtained after hydrocracking in the presence of the hydrocracking catalyst prepared using the beta-zeolite support in the Comparative Preparation Example which only have micropores, and FIG. 5 shows the distribution of total hydrocarbons obtained after hydrocracking in the presence of the hydrocracking catalyst prepared using the hierarchically porous beta-zeolite support in the Preparation Example. As can be seen in FIGS. 4 and 5, in the case of a hydrocracking catalyst prepared using a non-mesoporous zeolite support such as the beta-zeolite support in the Comparative Preparation Example which only have micropores, the molecular diffusion of the reactant and the product in the zeolite crystals was slow, and for this reason, secondary hydrocracking occurred, thus reducing the yield of hydrocarbons in the jet fuel range. On the other hand, in the case of a hydrocracking catalyst prepared using a zeolite support having a crystallite size of 50 nm or less and developed mesopores, such as the hierarchically porous beta-zeolite support prepared in the Preparation Example, the molecular diffusion of the reactant and the product was enhanced, so that secondary hydrocracking was inhibited, thus increasing the yield of hydrocarbons in the jet fuel range. Table 3 below shows the physical properties of hydrocarbons in the jet fuel range, produced using the hydrocracking catalyst prepared using as a support the hierarchically porous beta-zeolite prepared in the Preparation Example.

TABLE 3

| Sample | Aromatic compounds added (%) | Freezing point (° C.) | Density (kg/m³) | Sulfur content (mg/kg) |
| --- | --- | --- | --- | --- |
| ASTM D7566-14 standard | | <−40 | 0.73-0.77 | <15 |
| Palm oil-based bio-jet fuel | 0 | −52.2 | 0.765 | <1 |

As can be seen in Table 3 above, the hydrocarbons in the jet fuel range, produced in the presence of the hydrocracking catalyst prepared using as a support the hierarchically porous beta-zeolite, can be used as bio-jet fuel satisfying the ASTM D7566-14 standard even without addition of aromatic compounds.

Example 4

Production of Bio-Jet Fuel from n-Paraffins Produced from Microalgae *Aurantiochytrium*-Based Triglyceride Using the hydrocracking catalyst prepared using the hierarchically porous beta-zeolite support, a reaction was performed to convert n-paraffins, produced from microalgae *Aurantiochytrium*-based triglyceride in Example 2, into bio-jet oil. Before the reaction, the prepared hydrocracking catalyst was formed into a pellet by application of pressure, and then the pellet was crushed to a size of 150 to 200 μm, placed in a stainless-steel fixed-bed continuous flow reactor (inner diameter: ½ inch) and reduced in-situ under a hydrogen atmosphere at 400° C. Hydrocracking of the n-paraffins produced from *Aurantiochytrium*-based triglyceride was performed under the following conditions: reaction temperature of 200 to 300° C.; hydrogen pressure of 20 atm; weight hourly space velocity (WHSV) of 2.0 $h^{-1}$; and volume ratio of hydrogen gas flow introduced/liquid n-paraffin flow introduced of 6000. After the reaction, the liquid product was collected using a trap adjusted to at 130° C., and then the physical properties thereof were analyzed. As a result, it could be seen that when the hydrocracking catalyst prepared using the hierarchically porous beta-zeolite support prepared in the Preparation Example was used, the liquid yield was 38 wt % based on the weight of n-paraffins introduced.

Figure 6:
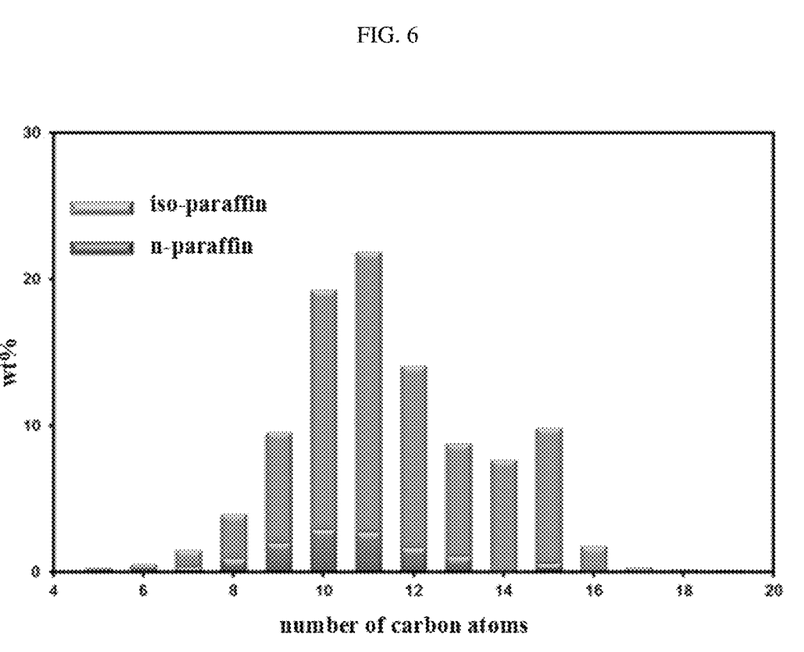
FIG. 6 is a graph showing the hydrocarbon distribution of a products obtained by hydrocracking of n-paraffins, produced from microalgae *Aurantiochytrium*-based triglyceride, in the presence of a hydrocracking catalyst prepared using a beta-zeolite prepared in Preparation Example 1 of the present invention as a support.

The products were analyzed by offline gas chromatography. FIG. 6 shows the distribution of hydrocarbons obtained after hydrocracking in the presence of the hydrocracking catalyst prepared using the hierarchically porous beta-zeolite support prepared in the Preparation Example. Table 4 below shows the physical properties of hydrocarbons in the jet fuel range, produced from n-paraffins produced from microalgae *Aurantiochytrium*-based triglyceride using the hydrocracking catalyst prepared using as a support the hierarchically porous beta-zeolite prepared in the Preparation Example.

TABLE 4

| Sample | Aromatic compounds added (%) | Freezing point (° C.) | Density (kg/m$^3$) | Sulfur content (mg/kg) |
|---|---|---|---|---|
| ASTM D7566-14 standard | | <−40 | 0.73-0.77 | <15 |
| *Aurantiochytrium* - based bio-jet fuel | 0 | −63.0 | 0.756 | <1 |

As can be seen in Table 4 above, the hydrocarbons in the jet fuel range, produced from n-paraffins produced from microalgae *Aurantiochytrium*-based triglyceride in the presence of the hydrocracking catalyst prepared using as a support the hierarchically porous beta-zeolite, can be used as bio-jet fuel satisfying the ASTM D7566-14 standard even without addition of aromatic compounds.

INDUSTRIAL APPLICABILITY

The hierarchically porous beta-zeolite according to the present invention has a larger external surface area and additionally produced mesopores, leading to an increase in the molecular diffusion rate of the reactant and the product in the zeolite crystals so that when the hierarchically porous beta-zeolite is used as a support for a hydrocracking catalyst, the residence time of the reactant and the product in the zeolite crystals can be reduced. As a result, secondary hydrocracking that may occur additionally is inhibited so that the yield of hydrocarbons in the jet fuel range can be improved, compared to the conventional beta-zeolite having only micropores along with the restricted molecular diffusion due to non-formation of mesopores.

In addition, when a catalyst comprising a metallic active component supported on the hierarchically porous beta-zeolite is used as a hydrocracking catalyst, bio-jet fuel satisfying the ASTM D7566-14 standard can be produced in high yield from n-paraffin feedstock produced from triglyceride-containing biomass.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A hydrocracking catalyst based on hierarchically porous beta-zeolite, comprising:
    (A) a hierarchically porous beta-zeolite support which has a specific surface area of 789 to 850 m$^2$g$^{-1}$, an external surface area of 316 to 400 m$^2$g$^{-1}$, a mesopore volume of 1.14 to 1.5 cm$^3$g$^{-1}$, and a total pore volume of 1.36 to 2.0 cm$^3$g$^{-1}$; and
    (B) a metallic component supported in the support.

2. The hydrocracking catalyst of claim 1, wherein the hierarchically porous beta-zeolite has a crystalline size of 10 to 50 nm.

3. The hydrocracking catalyst of claim 1, wherein the metallic component is one or more selected from the group consisting of platinum (Pt), palladium (Pd), ruthenium (Ru), iron (Fe), nickel (Ni), cobalt (Co) and molybdenum (Mo).

4. The hydrocracking catalyst of claim 1, wherein a content of the metallic component is 0.1 to 30 wt % based on total weight of the hydrocracking catalyst.

5. A method of preparing a hydrocracking catalyst based on hierarchically porous beta-zeolite comprising:
    (a) supporting a metallic component on the hierarchically porous beta-zeolite; and
    (b) heat-treating the hierarchically porous beta-zeolite in which the metallic component is supported,
    wherein the hierarchically porous beta-zeolite has a specific surface area of 789 to 850 m$^2$g$^{-1}$, an external surface area of 316 to 400 m$^2$g$^{-1}$, a mesopore volume of 1.14 to 1.5 cm$^3$g$^{-1}$, and a total pore volume of 1.36 to 2.0 cm$^3$g$^{-1}$.

6. The method of claim 5, wherein the metallic component is one or more selected from the group consisting of platinum (Pt), palladium (Pd), ruthenium (Ru), iron (Fe), nickel (Ni), cobalt (Co), and molybdenum (Mo), and a content of the metallic component is 0.1 to 30 wt % based on total weight of the hydrocracking catalyst.

7. The method of claim 5, wherein the heat treating is performed in a dry air or nitrogen atmosphere at a temperature of 300 to 600° C. for 1 to 10 hours.

8. The method of claim 5, further comprising, after step of (a), drying at a temperature of 60 to 130° C. for 2 to 24 hours.

9. A method of preparing bio jet fuel from triglyceride-containing biomass comprising:
    (a) producing n-paraffins by deoxygenating the triglyceride-containing biomass in presence of a deoxygenation catalyst; and
    (b) preparing bio jet fuel by hydrocracking the n-paraffins in presence of the hydrocracking catalyst based on hierarchically porous beta-zeolite of claim 1.

10. The method of claim 9, wherein the triglyceride-containing biomass is one or more selected from the group consisting of monoglyceride, diglyceride, fatty acid, fatty alcohol and fatty acid alkyl ester.

11. The method of claim 9, wherein the triglyceride-containing biomass is vegetable oil, animal fat or microalgae.

12. The method of claim 11, wherein the vegetable oil is one or more selected from the group consisting of palm oil, olive oil, rapeseed oil and soybean oil, the animal fat is non-edible beef tallow, and the microalgae is one or more selected from the group consisting of *Aurantiochytrium*, *Chlorella* and *Nannochloropsis*.

13. The method of claim 9, wherein a step of (a) is performed at a reaction temperature of 200 to 450° C., a hydrogen pressure of 1 to 150 atm, a weight hourly space velocity (WHSV) of 0.1 to 20 h$^1$, and a biomass oil liquid flow volume ratio including a hydrogen gas flow/triglyceride liquid flow volume ratio of 500 to 10,000.

14. The method of claim 9, wherein step (b) is performed at a reaction temperature of 200 to 400° C., a hydrogen pressure of 1 to 150 atm, a weight hourly space velocity (WHSV) of 0.1 to 20 h$^1$, and a hydrogen gas flow/triglyceride liquid flow volume ratio of 500 to 10,000.

15. The method of claim 9, wherein the deoxygenation catalyst is prepared by following steps: supporting and drying an aqueous solution containing a platinum precursor on an alumina support by incipient wetness impregnation, and calcining the dried aqueous solution in a dry air atmosphere; and reducing the calcined powder in a hydrogen atmosphere.

16. The method of claim 9, wherein the n-paraffins have $C_8$ to $C_{24}$.

\* \* \* \* \*

UNITED STATES PATENT AND TRADEMARK OFFICE
CERTIFICATE OF CORRECTION

PATENT NO. : 10,793,785 B2  
APPLICATION NO. : 15/988363  
DATED : October 6, 2020  
INVENTOR(S) : Yong Keun Chang et al.

Page 1 of 1

It is certified that error appears in the above-identified patent and that said Letters Patent is hereby corrected as shown below:

On the Title Page

Page 2, Item (56) under OTHER PUBLICATIONS, the first word in the title of the Verma et al. reference, "Aviiation", should be -- Aviation --.

In the Claims

Column 12, Line 40, "bio jet" should be -- bio-jet --.

Column 13, Line 4: "20 $h^1$" should be -- 20 $h^{-1}$ --.

Signed and Sealed this  
Twenty-fourth Day of November, 2020

Andrei Iancu  
*Director of the United States Patent and Trademark Office*